(12) United States Patent
O Donnell et al.

(10) Patent No.: US 6,529,857 B1
(45) Date of Patent: Mar. 4, 2003

(54) DISTRIBUTION AUTOMATION REMOTE TERMINAL UNIT

(75) Inventors: Graham O Donnell, Dublin (IE); Morgan Sheehy, Dublin (IE); Adrian Kearney, Dublin (IE); Gerry O'Grady, Wicklow (IE)

(73) Assignee: Viserge Limited, Dublin (IE)

( * ) Notice: Subject to any disclaimer, the term of this patent is extended or adjusted under 35 U.S.C. 154(b) by 0 days.

(21) Appl. No.: 09/548,662

(22) Filed: Apr. 13, 2000

Related U.S. Application Data (63) Continuation-in-part of application No. PCT/IE98/00082, filed on Oct. 13, 1998.

(30) Foreign Application Priority Data

Oct. 13, 1997 (IE) .............................................. S970742

(51) Int. Cl.[7] .................................................. H02J 13/00
(52) U.S. Cl. ........................ 702/188; 702/176; 702/85; 725/93; 340/825.06
(58) Field of Search ................................ 702/188, 176, 702/85; 340/825.36, 825.06, FOR 206, 5.54, 5.74, 508, 540; 706/210, 916, 912; 725/93

(56) References Cited

U.S. PATENT DOCUMENTS 5,237,511 A    8/1993   Caird et al. .................. 364/483
5,629,870 A  * 5/1997   Farag et al. .................. 700/286

FOREIGN PATENT DOCUMENTS

| EP | 0445448 A1 | 9/1991 |
| EP | 0558349 A1 | 9/1993 |
| EP | 0711018 A2 | 5/1996 |

\* cited by examiner

*Primary Examiner*—Kamini Shah
(74) *Attorney, Agent, or Firm*—Jacobson Holman PLLC (57) ABSTRACT

A distribution automation remote terminal unit (DA RTU) for electrical power distribution which has remote terminal units for plant units forming the distribution network. The DA RTU is divided into at least two independently operable units with separate power supplies and I/O ports and an inter unit communication means between the units. Preferably one unit is a measurement and protection unit and the other a communications and control unit.

46 Claims, 3 Drawing Sheets

DISTRIBUTION AUTOMATION REMOTE TERMINAL UNIT

CROSS-REFERENCE TO RELATED APPLICATIONS

This is a Continuation-In-Part of PCT/IE98/00083 filed Oct. 13, 1998.

BACKGROUND OF THE INVENTION

1. Field of the Invention

The present invention relates to a distribution automation remote terminal unit (DARTU) for use in a distribution automation systems particularly for electrical power distribution.

2. Prior Art

Generally speaking, such electrical power distribution has geographically remote plant units or installations forming the distributed network. They usually have one or more RTUs which have some or all of the system functions or measurement, protection, control and communications and these RTUs include suitable memory and signal processing means for said functions. Transmission of electrical supplies by utility companies is becoming more complex and expensive.

Customer service requirements are such that there is now little tolerance of instances of loss-of-supply and commercial considerations dictate a reduction in the number of personnel required to operate the network both for normal day-to-day operation and emergency fault-finding and maintenance. Furthermore, environmental considerations require electrical utilities to be able to shed load from portions of the network as required in circumstances. This is particularly important in areas which have a steadily growing demand for electricity which cannot be supplied by environmentally friendly methods.

Monitoring and/or automation of each node of the distribution network is therefore essential to ensure continuous and most efficient use is made of the power supplied. For example, control of the primary distribution network is particularly critical in that while it represents a relatively small number of network nodes it has a very significant impact on customers in terms of fault recovery.

Automation of these sites has typically been performed by the extensive use of RTUs. Such devices accept facility status information, control items of plant and measure analogue quantities either by directly accepting transducer outputs or by direct connection to the analogue quantities involved. A wide variety of communication schemes are utilised to link these units to a central location from which the whole network may be monitored and controlled.

Large number of RTUs are installed across the distribution network to monitor the state of the network and respond depending on the state of the network by running autonomous networks control functions, reporting to a master control station or reporting to a central master station controlling the entire network.

Historically these RTU units have been used to perform supervisory control and data acquisition (SCADA) and separate units have been used to perform separate protection functions. Both of these functions are vital for the continued performance of the network. Protection functions which are generally considered to be the most important aspect of operations utilise devices such as relays to control a variety of operations such as breaker protection and cable protection. SCADA systems involve the collection of information and the control of various points in the network including transmission sub-stations, distribution sub-stations and distribution networks.

Presently available DA RTU devices are either transducer based RTUs or transducerless RTUs. Transducer systems are based on "scaling down" a conventional sub-station RTU and the use of external transducers for AC voltage and current. These external transducers seriously compromise the ability of the RTU to derive calculated quantities and to determine the presence and direction of fault current. Such devices are not suitable for use in many protection schemes. In transducerless DA RTUs the external transducers are eliminated as AC voltages and currents are connected directly to the RTU via suitable transformers. These signals are measured which allows the RTU to accurately determine the values of voltage and current, derive calculated quantities and determine the presence and direction of fault current.

U.S. Pat. No. 5,237,511 (Caird et al) describes one construction of RTU for overcoming the problems of previously known RTUs which was an improvement on the RTUs known before that date. However, while this RTU overcomes some of the problems inherent in the previously known RTUs, there is still the problem of shared memories and components which means in the event of one of the parts of the RTU falling, the whole functionality of the RTU is destroyed.

There is therefore a need for an improved DA RTU which will overcome these problems.

In this specification, the term "function" has been used very broadly to cover whatever an RTU might be required to do, whether it be simply recording, measurement, storing, controlling, communicating and so on. There is no limit to the functions which may be performed and the term "function" is used in that general sense.

The term "failure" is used but "failure" may not necessarily mean absolute failure of a particular RTU or indeed absolute failure of portion of the RTU but it is used in the sense of any malfunction that would lead to inappropriate operation or use of a DA RTU.

The term "health messages" is used in this specification as a shorthand way of describing the reporting of information from one unit to another unit, which information relays information to the other unit which allows the other unit to assess the operating efficiency and availability of the unit sending the message.

The terms DARTU and RTU are used generally and include any form of controller used for distribution systems and not just conventional ones.

STATEMENTS OF INVENTION

According to the invention, there is provided a distribution automation remote terminal unit for a control system having a master control station communicating with plant units each having one or more RTUs having some or all of the system functions of measurement protection control and communications and including suitable memory and signal processing means for said functions characterised in that the distribution automation remote terminal unit comprises:

at least two separate independently operable units with separate power supplies and I/O ports; and an inter-unit communications means and in which one of the units is assigned the function of communication with the master station.

By separating the communications function from the remainder of the functions and by having independent functions, the failure of one unit does not cause the failure of the other.

Ideally, diagnostic means are provided in each unit for fault analysis and reporting. It is very important that any failure be realised and if the inter-unit communication means reports failure and the failure is on separate units having a DA RTU with protection, communication and control capabilities, then it would be possible for the control and the protection facility to continue to be operated in spite of the communications unit malfunctioning. If it is a different function which cannot be performed than the fact can be reported.

Preferably, the inter unit communication means is arranged to constantly deliver health messages from respective diagnostic means between the units and in which the units assigned the function of communication delivers said health messages to the master station as appropriate. It is very important that the master station be warned of any malfunction of any of the units.

Preferably, there are two units, namely a measurement and protection unit and then a communications and control unit. There is a considerable advantage in keeping the protection function separate from the communication function. For example, if the communication function fails, then the protection function still operates, while if the protection unit fails, the communications unit can notify the master station and the control unit can then be operated via the communications unit to ensure that whatever should be done with the protection unit failing, will be done. This may include, for example, manual or remote operation.

In one embodiment of the invention, the communications and control unit has means to operate the installation in response to the failure of some portion of the measurement and protection unit. By having additional means on the control means, sufficient to operate the installation when the protection unit is malfunctioning, is particularly advantageous. It does not have to be the optimum way to operate the plant unit but simply an adequate way.

In one embodiment of the invention, the measurement and protection means includes enabling means so that when it receives indication of the failure of some portion of the communications and control means the measurement and protection means continues to operate. It is very important that the measurement and protection means continue to operate even if communication with the master station has been terminated. In this latter embodiment of the invention, the two units comprise two separate physical modules and ideally the modules communicate to a dual port memory mechanism. By having two separate modules, it is possible that when one only needs to use, for example, a measurement and protection function to simply use that module and not to provide a module for the function of communications and control. Similarly, in some cases, communications and control will be required and there will be no need for measurement and protection. It also facilitates the adding of the additional module and thus the function at a later date.

In one embodiment, one port is for transfer of control information from the communication and control unit to the measure and protection unit and the other to transfer control information in the opposite direction.

Preferably, the modules communicate through a high speed memory contents sharing mechanism.

Ideally, the measurement and protection unit is divided into at least two separate sub-units, namely a measurement sub-unit and a protection sub-unit, each with an independent power supply and I/O ports and connected together by a sub-unit communications means. The advantage of having separate sub-units is that you remove the possibility of one of the sub-units being inoperable due to the failure of the other. The less facilities are shared and the more independently operable the units are, the better. However, in normal operation the ability to share the information and controls at high speed is very important.

Similarly, the communications and control unit is divided into at least two separate sub-units, namely a communications sub-unit and a control sub-unit, each with an independent power supply and I/O ports connected together by a sub-unit communications means.

Ideally, an automation system for an electrical power distribution network should have DA RTUs of the type hereinbefore described.

DETAILED DESCRIPTION OF THE INVENTION

The invention will be more clearly understood from the following description of one embodiment thereof, given by way of example only, with reference to the accompanying drawings, in which.

Figure 1:
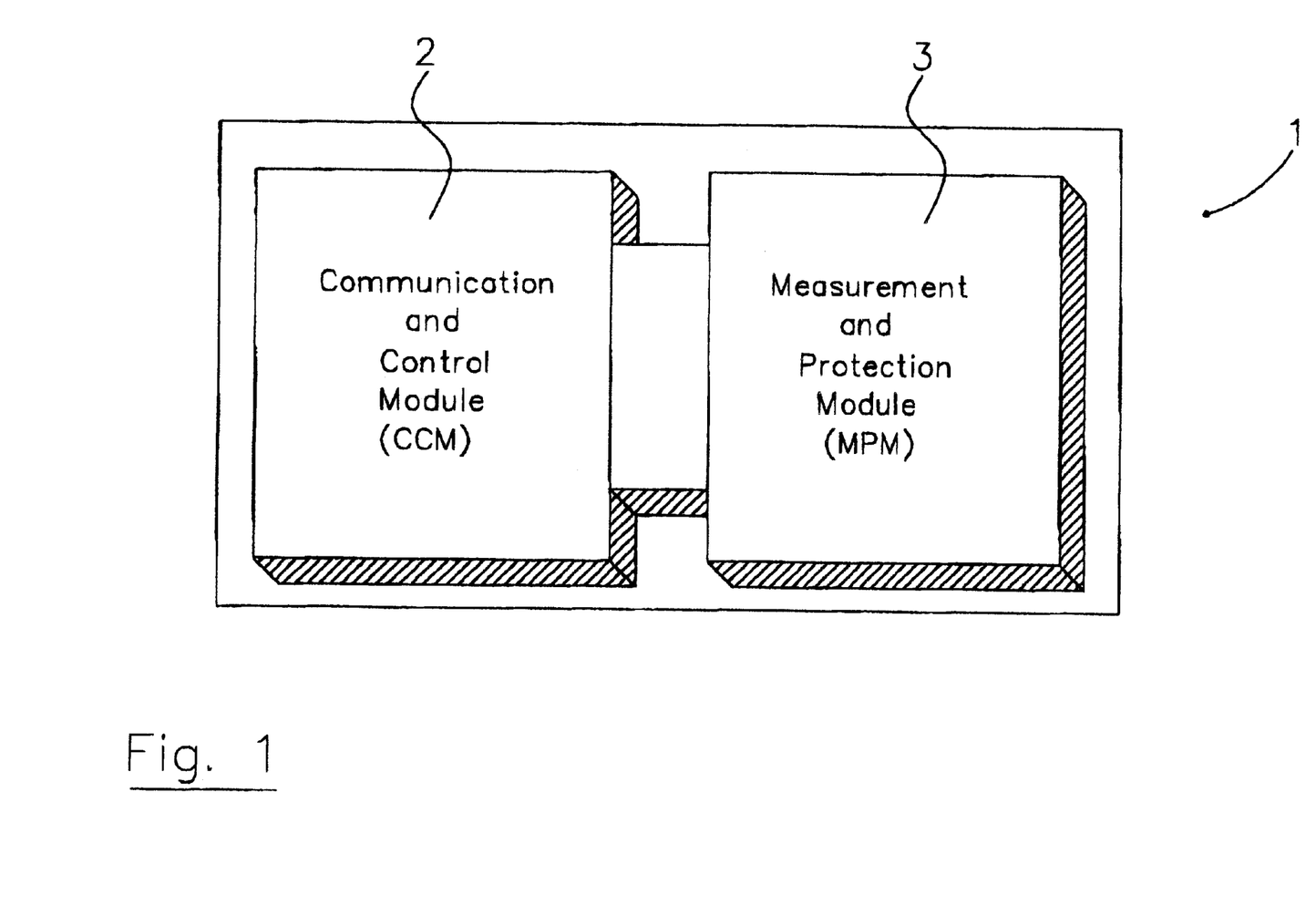
FIG. 1 is a block diagram of a DA RTU according to the invention.

Referring to the drawings and initially to FIG. 1 there is illustrated a DA RTU formed in accordance with the invention illustrated generally by the numeral 1. The DA RTU 1 is positioned at various nodes in a power distribution network (not shown) to control and monitor correct distribution of power in the network.

The DA RTU 1 has two physically separate modules, a communications and control module (CCM) 2 and an associated measurement and protection module (MPM) 3. Housed in the CCM module 2 and the MPM module 3 are two entirely separate independently operated units with separate power supplies and separate I/O ports. There is also an inter-communication means 4 between the CCM module 2 and the MPM module 3. The term "module" is used for the whole physical construction and "unit" in a more general sense in so far as module denotes a physically separate unit and unit may not.

The CCM module 2 incorporates means for performing supervisory control and data acquisition (SCADA) functions for the network and the MPM module 3 incorporates protection means for performing protection functions. In practice, the two units or modules 2 and 3 communicate through a dual port memory mechanism in which one port is for the transfer of control information from the CCM module 2 and the other port is for the transfer of controlled information in the opposite direction.

Figure 2:
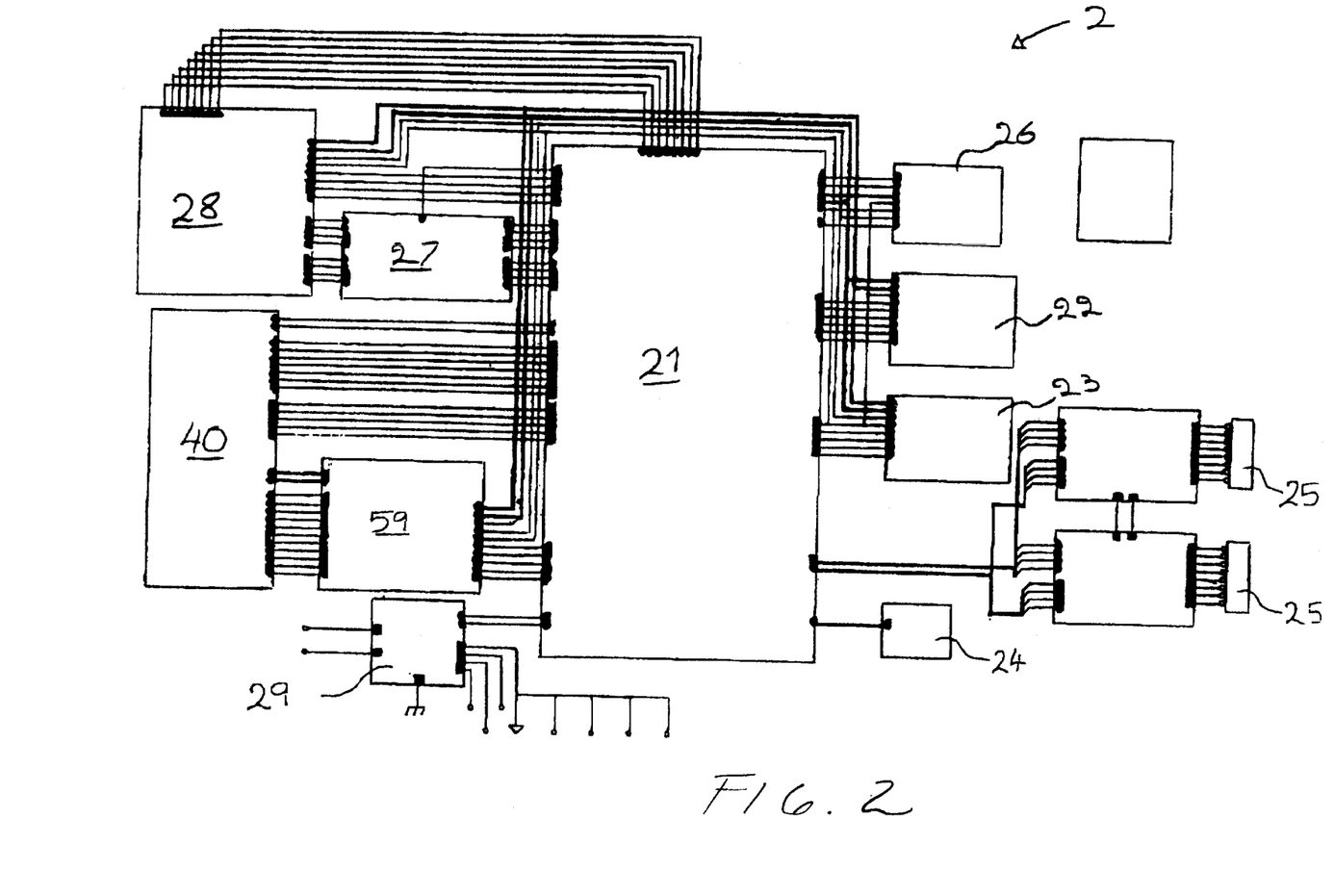
FIG. 2 is a schematic diagram of portion of the circuit for the DA RTU of FIG. 1.

Referring now to FIG. 2, the circuit housed in the communications and control module (CCM) 2 is illustrated. More correctly, as mentioned above, this should now be referred to as the CCM unit 2. Similarly when referring to the circuit of the MPM module 3, one should refer to the MPM unit 3. The CCM unit 2 comprises a processor 21 which runs software elements contained in flash memory 22 and stores data in a RAM device 23. The CCM unit 2 passes plant indications from the monitored network using a digital input bank 24, a digital output bank 25 and an analog input bank 26. These banks 24, 25, 26 are typically connected to plant units such as breakers, isolators and various other items of equipment. The processor 21 firm ware in the flash memory 22 looks at the banks 24, 25, 26 to determine their status. Data values read from the banks 24, 25, 26 are stored in the RAM device 23. The processor 21 retrieves the data values and formats them into a protocol which it then transmits using a UART 28 to one of a number of serial ports 27. Radio or any other suitable communications medium may be used and such messages are generally sent in response to a poll from a master station (not shown). Master stations of this type are typically located in a control centre which would poll each DA RTU 1 looking for data and the processor 21 would determine from data stored in RAM device 23 the most appropriate data to return.

In more detail the digital output bank 25 in conjunction with the processor 2 interprets commands coming down over the protocol through the serial port 27 in accordance with the particular protocol running to drive a given output of the bank 25. Additionally the processor 2 ensures that the drive outputs from the bank 25 have occurred. The analog input bank 26 is connected to an analog to digital converter so that values read may be stored in the RAM device 23.

An important feature of the invention is that the CCM unit 2 incorporates an independent supply 29 allowing the unit to operate independently of the MPM module 3 if desired. Additionally if a fault develops in the MPM unit 3 operation of the CCM unit 2 is not affected. It will be appreciated that the CCM unit 2 may utilise extensive programmable logic for example in address decoding. Using the communication function of the CCM unit 2 in the manner described it is also possible to re-program the CCM unit 2 to alter modes of operation without halting normal processing.

The processor 2 is connected to an MPM isolation block 59 formed from a series of buffers to allow communication with the MPM 3.

Figure 3:
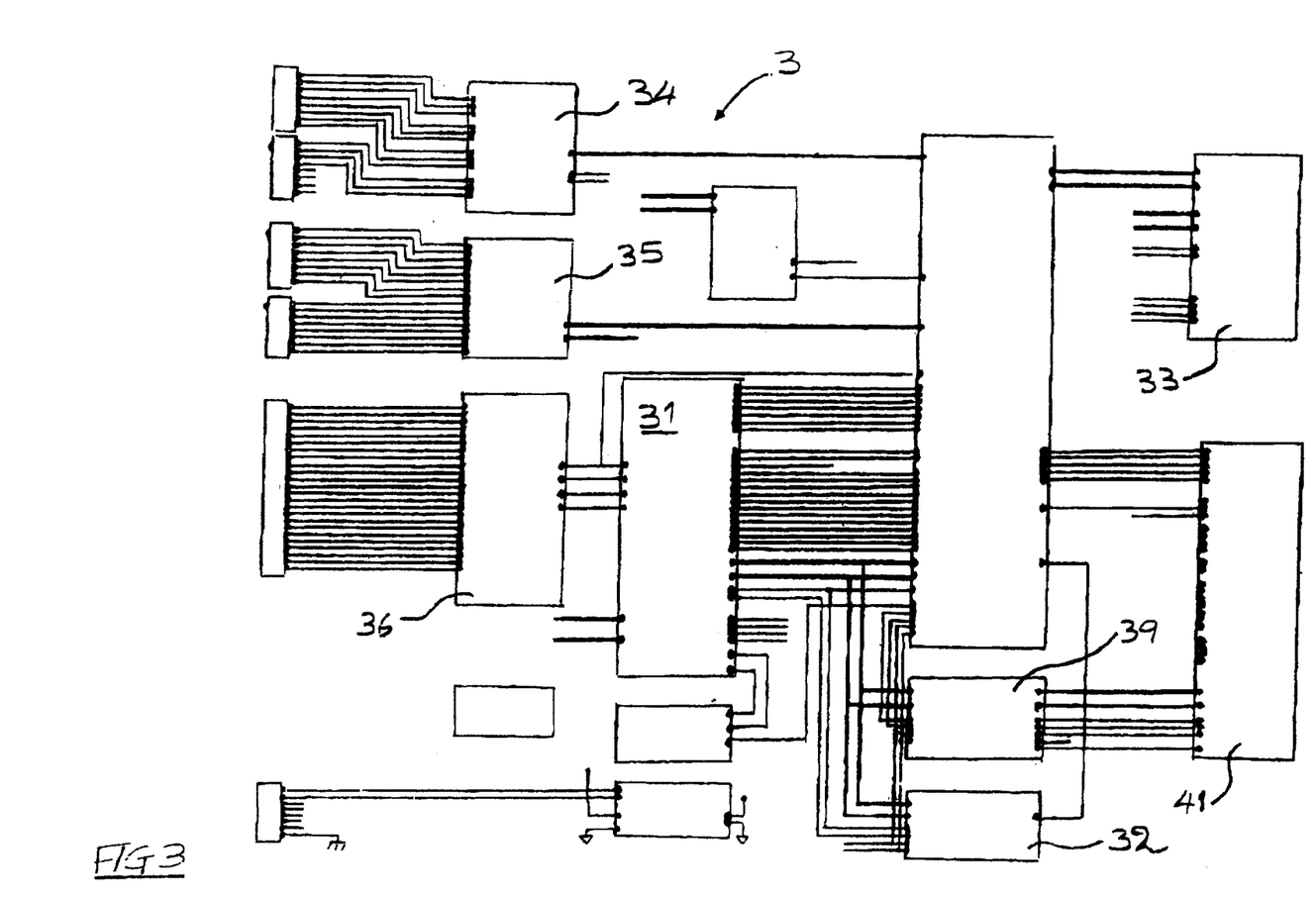
FIG. 3 is a schematic diagram of portion of the circuit of the remainder of the DA RTU illustrated in FIG. 1.

Referring now to FIG. 3 the circuit of the measurement and protection module MPM unit 3 is illustrated. The MPM unit 3 has a digital input bank 34, a digital output bank 35 and an analog input bank 36. The MPM unit 3 also includes a memory 33, a flash memory 32 and dual port RAM 39 and a digital signal processor DSP 31. While many elements of the MPM unit 3 such as the input bank 34 and the digital output bank 35 are similar to those described with respect to the CCM unit 2 it is important to note that they are distinct and independently operable devices.

The MPM unit 3 operates to perform AC measurements on the network and to respond to those measured AC values. The analog input bank 36 has ten channels of analog inputs four for connection to a number of current transformers (not shown) and six for connection to a number of voltage transformers (not shown). By configuring the analog input bank 36 in this way it will be appreciated that the DA RTU 1 is extremely versatile enabling connection to a wide variety of applications such as a single phase feeder with a single current and single voltage up to a three phase feeder with four currents and six voltages. The DSP 31 samples all ten channels at upwards of sixteen times a cycle, each cycle taking approximately twenty milliseconds on either side of a breaker and stores the sample data in the SRAM 33. The DSP 31 then uses the sample data from the SRAM 33 in conjunction with suitable digital algorithms known in the art to calculate system variable such as RMS voltage and current and also to determine power, active and reactive power and power factor etc. It will be appreciated that such algorithms are well known. The MPM unit 3 also performs the protection calculations in such a manner as to detect unacceptable operating conditions and to control external equipment to protect electrical circuits.

Obviously the number of channels and inputs will vary from module to module.

The dual port RAM 39 is used for the interfacing the MPM unit 3 with the CCM unit 2 and the flash memory 32 is used for storing the programs that the DSP processor 31 runs and for storing the algorithms. As inputs arrive to the analog input bank 36 they are sampled by A to D converters in the bank 36 under control of the DSP processor 31. The values are then taken by the DSP 31, stored in the SRAM 33 and processed by the DSP 31 to obtain a post processing value which is communicated to the dual port RAM 39 to be read by the CCM unit 2.

In the event of a fault in the CCM unit 2 the MPM unit 3 operates as a stand alone unit. In one situation the digital inputs and digital outputs would be connected to, for example, a breaker. Analog values would indicate the status of the supply on the line on either side of the breaker and the algorithms would detect things like over-current, over-voltage and various other fault conditions. The DSP 31 would having calculated the appropriate values and detecting a fault there in response to parameters downloaded either through a serial port 37 or from the CCM unit 2 via the dual port RAM 39 determine the most appropriate response. Usually in the instance of a such a fault, it will trip the breaker by driving one or more of the digital outputs of the digital output bank 25 and verifying that action has occurred. As before the MPM unit 3 also has its own power supply which allows it to operate as a stand alone unit.

To provide the functionality of both component parts a CCM to MPM interconnection 40 of the CCM 2 is linked to an MPM to CCM interconnection 41. When so linked values determined by the MPM unit 3 in terms of RMS voltage and current power, reactive power, power factor etc. are communicated through the dual port RAM 39, to the CCM unit 2. The values are then sent to the master station.

Additionally this provides the ability to download sequences to the CCM unit 2. Such sequences arrive over the serial port 27 and are stored in flash memory 22. When operated on by the processor 21 they can use values from the MPM 3 to modify parameters in the MPM 3 depending on network status. This symbiosis between the CCM unit 2 and the MPM unit 3 provide greater functionality than either of them in isolation.

A further feature of the current invention relates to the storage of code for both the MPM unit 3 and the CCM unit 2 in flash memory. The use of such device is particularly important given the inhospitable environments in which the units may be located. By utilising flash memory, remote upgrades of the firmware in the DA RTU 1 is possible using the serial port so that the master station in the control centre would be able to download a new version of software through the protocol and the serial port and the processor would automatically update the code it has in flash. Similar upgrades are also possible for the MPM unit 3. It can pass the revised firm ware across the dual port RAM 39 and into the flash on the MPM unit 3. Additionally these two flash memory stores being separated in different modules ensures that a failure in one does not adversely affect operation of the second.

Other methods of communication may be used to achieve efficient information sharing. Indeed any high speed memory contents sharing mechanism can be used.

Both elements of the unit, namely the CCM unit 2 and the MPM unit 3 provide supervisory control of each other using the dual port RAM 39 in the MPM unit 3 to pass messages with each unit validating the messages.

The invention may be implemented using a wide variety of strategies which will be readily apparent.

In summary, it will be appreciated that as both units communicate through a well defined interface and as there are no common components except for this interface, that independence of operation is achieved. Further because the two parts are independent, each monitors the operation of the other through a handshaking mechanism thereby allowing rapid fault finding and minimising downtime. The physical construction of the modules allows one to be replaced while leaving the other running and vice versa. Also, by using the present invention, retrofitting is a possibility without any difficulty.

While in the embodiment described above, the DA RTU has been described as effectively two units, there is, for example, no reason why the CCM unit 2 and the MPM unit 3 described above, could not be further sub-divided into two separate sub-units which could even be housed in two separate physical modules. If, for example, the measurement and protection unit is divided into two separate sub-units, it would preferably be divided into a measurement sub-unit and a protection sub-unit and then there each would have an independent power supply and I/O ports. It would then be necessary to have sub-unit communications to ensure the adequate operation of the two devices. Similarly, the communications and control unit could be divided into two separate sub-units, namely, a communications sub-unit and a control sub-unit, each with an independent power supply and I/O ports connected together by a suitable sub-unit communications means.

It is also envisaged that in any DA RTU or, more strictly speaking, in any RTU, where there are various functions that have to be performed, it is possible to divide the DA RTU or RTU into even further units, each one operable with a separate power supply and separate I/O ports and with inter-unit communication means. In this way, every vital function of an RTU can be kept separate from all the other functions so that it operates totally independently on its own. This will more conveniently allow, for example, for the duplication of a particular function. It might mean that a DA RTU would have two units, each of which would provide a protection function. One of the units would be so arranged only to come into operation when the first protection unit failed.

In this invention, the terms "comprise, comprises, comprising, comprised" and the terms "include, includes, including, included" are to be used interchangeably and to be accorded the widest possible interpretation and meaning. Further, the invention is not limited to the embodiment described above but may be varied in both construction and detail within the scope of the claims.

What is claimed is:

1. A distribution automation remote terminal unit (DARTU) for a control system having a master control station communicating with plant installations each having one or more DRTUs having some or all of the system functions of measurement protection control and communications and including suitable memory and signal processing means for said functions wherein the distribution automation remote terminal unit comprises:

at least two separate independently operable units with separate power supplies, each of the units performing a different system function to the other unit;

an inter-unit communication means including an Input/Output port on each separate independently operable unit for inter-unit communication; and only one of said units includes means for communicating with the master control station.

2. The distribution automation remote terminal unit as claimed in claim 1, wherein diagnostic means are provided in each unit for fault analysis and reporting.

3. The distribution automation remote terminal unit as claimed in claim 1, further comprising diagnostic function means in each unit for reporting information of fault analyses and in which the inter-unit communication means is arranged to constantly deliver reported information from respective diagnostic function means between the units and in which said means for communicating delivers said reported information to the master station as appropriate.

4. The distribution automation remote terminal unit as claimed in claim 1, wherein said two units, namely a measurement and protection unit and a communications and control unit, the control and communications unit comprising means for communicating with the master station.

5. The distribution automation remote terminal unit as claimed in claim 1, wherein said two units, namely a measurement and protection unit and a communications and control unit and in which the communications and control unit has means to operate a system installation function in response to the failure of some portion of the measurement and protection unit.

6. The distribution automation remote terminal unit as claimed in claim 1, wherein said two units, namely a measurement and protection unit and a communications and control unit and in which the measurement and protection unit includes system enabling function means so that when it receives indication of the failure of some portion of the communication and control means the measurement and protection means continues to operate.

7. The distribution automation remote terminal unit as claimed in claim 1, wherein said two units, namely a measurement and protection unit and a communications and control unit and in which the communications and control unit has means to operate a system installation function in response to the failure of some portion of the measurement and protection unit and in which the measurement and protection means includes system enabling function means so that when it receives indication of the failure of some portion of the communication and control means the measurement and protection means continues to operate.

8. The distribution automation remote terminal unit as claimed in claim 1, wherein there are two separate physical modules forming said two units namely a measurement and protection unit and then a communications and control unit.

9. The distribution automation remote terminal unit as claimed in claim 1, wherein there are two separate physical modules forming said two units namely a measurement and protection unit and a communications and control unit and in which the communications and control unit has means to operate a system installation in response to the failure of some portion of the measurement and protection unit.

10. The distribution automation remote terminal unit as claimed in claim 1, wherein there are two separate physical modules forming said two units namely a measurement and protection unit and a communications and control unit and in which the measurement and protection unit includes system enabling function means so that when it receives indication of the failure of some portion of the communication and control means the measurement and protection means continues to operate.

11. The distribution automation remote terminal unit as claimed in claim 1, wherein there are two separate physical modules forming said two units namely a measurement and protection unit and a communications and control unit and in which the communications and control unit has means to operate a system installation function in response to the failure of some portion of the measurement and protection unit and in which the measurement and protection means includes system enabling function means so that when it receives indication of the failure of some portion of the communication and control means the measurement and protection means continues to operate.

12. The distribution automation remote terminal unit as claimed in claim 1, wherein there are two separate physical modules forming said two units namely a measurement and protection unit and a communications and control unit which modules communicate through a dual port memory mechanism.

13. The distribution automation remote terminal unit as claimed in claim 1, wherein there are two separate physical modules which communicate through a dual port memory mechanism, the modules forming said two units namely a measurement and protection unit and a communications and control unit and in which the communications and control unit has means to operate a system installation function in response to the failure of some portion of the measurement and protection unit.

14. The distribution automation remote terminal unit as claimed in claim 1, wherein there are two separate physical modules which communicate through a dual port memory mechanism, the modules forming said two units namely a measurement and protection unit and then a communications and control unit and in which the measurement and protection means includes system enabling function means so that when it receives indication of the failure of some portion of the communication and control means the measurement and protection means continues to operate.

15. The distribution automation remote terminal unit as claimed in claim 1, wherein there are two separate physical modules which communicate through a dual port memory mechanism, the modules forming said two units namely a measurement and protection unit and then a communications and control unit and in which and in which the communications and control unit has means to operate a system installation function in response to the failure of some portion of the measurement and protection unit and in which the measurement and protection means includes system enabling function means so that when it receives indication of the failure of some portion of the communication and control means the measurement and protection means continues to operate.

16. The distribution automation remote terminal unit as claimed in claim 1, wherein there are two separate physical modules forming said two units namely a measurement and protection unit and then a communications and control unit and in which the modules communicate through a dual port memory mechanism and in which one port is for transfer of control information from the communication and control unit to the measurement and protection unit and the other to transfer control information in the opposite direction.

17. The distribution automation remote terminal unit as claimed in claim 1, wherein there are two separate physical modules forming said two units, namely a measurement and protection unit and then a communications and control unit and in which the communications and control unit has means to operate a system installation function in response to the failure of some portion of the measurement and protection unit and in which the modules communicate through a dual port memory mechanism one port of which is for transfer of control information from the communication and control unit to the measurement and protection unit and the other to transfer control information in the opposite direction.

18. The distribution automation remote terminal unit as claimed in claim 1, wherein there are two separate physical modules forming said two units namely a measurement and protection unit and then a communications and control unit and in which the measurement and protection means includes system enabling function means so that when it receives indication of the failure of some portion of the communication and control means the measurement and protection means continues to operate and in which the modules communicate through a dual port memory mechanism and in which one port is for transfer of control information from the communication and control unit to the measurement and protection unit and the other to transfer control information in the opposite direction.

19. The distribution automation remote terminal unit as claimed in claim 1, wherein there are two separate physical modules forming said two units namely a measurement and protection unit and then a communications and control unit and in which the communications and control unit has means to operate the installation in response to the failure of some portion of the measurement and protection unit and in which the measurement and protection means includes system enabling function means so that when it receives indication of the failure of some portion of the communication and control means the measurement and protection means continues to operate and in which the modules communicate through a dual port memory mechanism of which one port is for transfer of control information from the communication and control unit to the measurement and protection unit and the other to transfer control information in the opposite direction.

20. The distribution automation remote terminal unit as claimed in claim 1, wherein there are two separate physical modules forming said two units namely a measurement and protection unit and then a communications and control unit and in which the modules communicate through a high speed memory contents sharing mechanism.

21. The distribution automation remote terminal unit as claimed in claim 1, wherein there are two separate physical modules which communicate through a high speed memory contents sharing mechanism, the modules forming said two units namely a measurement and protection unit and a communications and control in which the communications and control unit has means to operate a system installation function in response to the failure of some portion of the measurement and protection unit.

22. The distribution automation remote terminal unit as claimed in claim 1, wherein there are two separate physical modules which communicate through a high speed memory contents sharing mechanism, the modules forming said two units namely a measurement and protection unit and a communications and control unit and in which the measurement and protection means includes system enabling function means so that when it receives indication of the failure of some portion of the communication and control means the measurement and protection means continues to operate.

23. The distribution automation remote terminal unit as claimed in claim 1, wherein there are two separate physical modules which communicate through a high speed memory contents sharing mechanism, the modules forming said two units namely a measurement and protection unit and then a communications and control unit and in which and in which the communications and control unit has means to operate a system installation function in response to the failure of some portion of the measurement and protection unit and in which the measurement and protection means includes system enabling function means so that when it receives indication of the failure of some portion of the communication and control means the measurement and protection means continues to operate.

24. The distribution automation remote terminal unit as claimed in claim 1, wherein there are two separate physical modules which communicate through a dual port memory mechanism and by a high speed memory contents sharing mechanism, the modules forming said two units namely a measurement and protection unit and then a communications and control unit.

25. The distribution automation remote terminal unit as claimed in claim 1, wherein there are two separate physical modules which communicate through a dual port memory mechanism and by a high speed memory contents sharing mechanism, the modules forming said two units namely a measurement and protection unit and a communications and control unit and in which the communications and control unit has means to operate a system installation function in response to the failure of some portion of the measurement and protection unit.

26. The distribution automation remote terminal unit as claimed in claim 1, wherein there are two separate physical modules which communicate through a dual port memory mechanism and by a high speed memory contents sharing mechanism, the modules forming said two units namely a measurement and protection unit and then a communications and control unit and in which the measurement and protection means includes system enabling function means so that when it receives indication of the failure of some portion of the communication and control means the measurement and protection means continues to operate.

27. The distribution automation remote terminal unit as claimed in claim 1, wherein there are two separate physical modules which communicate through a dual port memory mechanism and by a high speed memory contents sharing mechanism, the modules forming said two units namely a measurement and protection unit and then a communications and control unit and in which the communications and control unit has means to operate a system installation function in response to the failure of some portion of the measurement and protection unit and in which the measurement and protection means includes system enabling function means so that when it receives indication of the failure of some portion of the communication and control means the measurement and protection means continues to operate.

28. The distribution automation remote terminal unit as claimed in claim 1, wherein said two units, namely a measurement and protection unit and a communications and control unit and in which the measurement and protection unit is divided into at least two separate sub-units, namely a measurement sub-unit and a protection sub-unit, each with an independent power supply and I/O ports and connected together by a sub-unit communications means.

29. The distribution automation remote terminal unit as claimed in claim 1, wherein said two units, namely a measurement and protection unit and a communications and control unit and in which communications and control unit is divided into at least two separate sub-units, namely a communications sub-unit and a control sub-unit, each with an independent power supply and I/O ports and connected together by a sub-unit communications means.

30. The distribution automation remote terminal unit as claimed in claim 1, wherein said two units namely a measurement and protection unit and then a communications and control unit and in which the measurement and protection unit is divided into at least two separate sub-units, namely a measurement sub-unit and a protection sub-unit, each with an independent power supply and I/O ports and connected together by a sub-unit communications means and in which the communications and control unit is divided into at least two separate sub-units, namely a communications sub-unit and a central sub-unit, each with an independent power supply and I/O ports connected together by a sub-unit communications means.

31. A distribution automation remote terminal unit DARTU for a control system having a master control station communicating with plant installations each having one or more DARTUs having some or all of the system functions of measurement protection control and communications and including suitable memory and signal processing means for said functions wherein the distribution automation remote terminal unit comprises:
   a separate independently operable measurement and protection unit with an independent power supply performing a system function;
   a separate communications and control unit with an independent power supply performing a different system function to the system function of the measurement and protection unit;
   an inter-unit communication means including an Input/Output port on each separate independently operable unit for inter-unit communication; and
   one of said units includes means for communication with the master control station.

32. The distribution automation remote terminal unit as claimed in claim 31, wherein the measurement and protection unit is divided into at least two separate sub-units, namely a measurement sub-unit and a protection sub-unit, each with an independent power supply and I/O ports and connected together by a sub-unit communications means.

33. The distribution automation remote terminal unit as claimed in claim 31, wherein the communications and control unit is divided into at least two separate sub-units, namely a communications sub-unit and a control sub-unit, each with an independent power supply and I/O ports connected together by a sub-unit communications means.

34. The distribution automation remote terminal unit as claimed in claim 31, further comprising diagnostic means in each unit for reporting information of fault analyses and in which the inter-unit communication means is arranged to constantly deliver reported information from respective diagnostic means between the units and in which said means for communicating delivers said health messages to the master station as appropriate.

35. The distribution automation remote terminal unit as claimed in claim 31, wherein the communications and control unit has means to operate a system installation function in response to the failure of some portion of the measurement and protection unit.

36. The distribution automation remote terminal unit as claimed in claim 31, wherein the measurement and protection means includes a system enabling function means so that when it receives indication of the failure of some portion of the communication and control means the measurement and protection means continues to operate.

37. The distribution automation remote terminal unit as claimed in claim 31, wherein the communications and control unit has means to operate the installation in response to the failure of some portion of the measurement and protection unit and in which the measurement and protection means includes a system enabling function means so that when it receives indication of the failure of some portion of the communication and control means the measurement and protection means continues to operate.

38. The distribution automation remote terminal unit as claimed in claim 31, wherein the two units comprise two separate physical modules.

39. The distribution automation remote terminal unit as claimed in claim 31, wherein the two units comprise two separate physical modules and in which the modules communicate through a dual port memory mechanism.

40. The distribution automation remote terminal unit as claimed in claim 31, wherein the two units comprise two separate physical modules and in which the modules communicate through a high speed memory contents sharing mechanism.

41. The distribution automation remote terminal unit as claimed in claim 31, wherein the two units comprise two separate physical modules and in which the modules communicate through a dual port memory mechanism by a high speed memory contents sharing mechanism.

42. An automation system for an electrical power distribution network having a distribution automation remote terminal unit for a control system having a master control station communicating with plant installations each having one or more DRTUs having some or all of the system functions of measurement protection control and communications and including suitable memory and signal processing means for said functions wherein the distribution automation remote terminal unit comprises:

at least two separate independently operable units with separate power supplies each of the units performing a different system function to the other unit;

an inter-unit communication means including an Input/Output port in each separate independently operable unit for inter-unit communication; and only one of said units includes means for communicating with the master control station.

43. The system as claimed in claim 42, wherein there are two separate physical modules forming said two units namely a measurement and protection unit and then a communications and control unit.

44. The system as claimed in claim 42, wherein the remote terminal unit comprises two separate physical modules forming two said units namely a measurement and protection unit and then a communications and control unit and in which the modules communicate through a dual port memory mechanism and in which one port is for transfer of control information from the communication and control unit to the measurement and protection unit and the other to transfer control information in the opposite direction.

45. The system as claimed in claim 42, wherein the remote terminal unit comprises said two units, namely a measurement and protection unit and a communications and control unit and in which communications and control unit is divided into at least two separate sub-units, namely a communications sub-unit and a control sub-unit, each with an independent power supply and I/O ports connected together by a sub-unit communications means.

46. The system as claimed in claim 42, wherein the remote terminal unit comprises said two units, namely a measurement and protection unit and a communications and control unit and in which the measurement and protection unit is divided into at least two separate sub-units, namely a measurement sub-unit and a protection sub-unit, each with an independent power supply and I/O ports and connected together by a sub-unit communications means and in which the communications and control unit is divided into at least two separate sub-units, namely a communications sub-unit and a control sub-unit, each with an independent power supply and I/O ports connected together by a sub-unit communications means.

* * * * *